Patented June 24, 1930

1,766,058

UNITED STATES PATENT OFFICE

MELVIN DE GROOTE, OF ST. LOUIS, AND LOUIS T. MONSON, OF MAPLEWOOD, MISSOURI, ASSIGNORS TO WM. S. BARNICKEL & COMPANY, OF WEBSTER GROVES, MISSOURI, A CORPORATION OF MISSOURI

PROCESS FOR BREAKING PETROLEUM EMULSIONS

No Drawing.   Application filed January 21, 1929.  Serial No. 334,101.

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

We have discovered that water-soluble derivatives of lignin are capable of being used successfully as treating agents or demulsifying agents in the resolution of petroleum emulsions of the water-in-oil type. Accordingly, we have devised a process for "breaking" such emulsions that contemplates subjecting the emulsion to the action of a treating agent or demulsifying agent comprising a water-soluble derivative of lignin, thereby causing the emulsion to break down and separate into its component parts of oil and water or brine when the emulsion is permitted to remain in a quiescent state after treatment. Such a process is efficient, it is inexpensive to practice, and it is distinguished from prior chemical processes for breaking petroleum emulsions of the water-in-oil type, in that it employs as a treating agent or demulsifying agent, a substance or material not heretofore used for that purpose.

Lignin, also known as lignone or lignose, is a substance that is obtained from wood, wood-like products and straw, and while it varies in composition, it represents in a general way carbohydrates varying from 27 carbon atoms to 40 carbon atoms. Lignic acids or their salts, are carbohydrate derivatives obtained from lignin. They are substitution or addition products obtained by the action of various reagents, such as alkaline hydrates, nitrates, acetates and bisulfites at high temperature, especially under the action of long continued pressure. Relatively pure lignic acid can be obtained by treating a material such as straw with sodium carbonate, or some other suitable alkali, followed by acid precipitation. The lignic acid material obtained by this reaction can be re-dissolved and again precipitated, the above described procedure being repeated until the required purity is obtained.

The derivatives of lignin used as the treating agent or demulsifying agent of our process are derivatives of those acidic materials derived from lignin, which are themselves water-soluble or which combine with suitable bases to give water-soluble salts. For convenience we will herein use the term "lignic acids" to designate such materials in the unneutralized state. Such acidic derivatives of lignin can be obtained from various sources and produced in various ways at a relatively low cost. One source of supply of soluble derivatives of lignic acids suitable for use in our process, is the waste liquor that is derived from the soda process and from the sulfite process of producing wood pulp for use in the manufacture of paper stock, which waste liquor contains a relatively high percentage of lignic acids. Lignic acids may also be obtained by introducing a carboxyl group or sulfonic group into a carbohydrate group, or by forming the addition product with a bisulfite. The acidic derivatives of lignin are characterized by the presence of an acid hydrogen ion which is capable of combining with a suitable base, the substance resulting from this reaction representing a water-soluble salt of a lignic acid. Those lignic acids which contain sulfur in the form of an acid sulfate or a sulfonic group or a bisulfite, are termed "sulfo-lignic acids" and are distinguished from the broad group of lignic acid bodies by the presence of sulfur in the molecule.

The form, state or condition of the derivative of lignin used as the demulsifying agent of our process, may be varied to suit existing conditions. It may be used in the acid state, alkaline state or neutral state. It may be used in a dilute state or concentrated state. In order that the oil recovered by our process will not have a destructive corroding action on the pipe lines, tank cars or storage tanks in which said oil is confined, we prefer to use said derivative in a neutralized state and employ magnesium oxide to neutralize same. However, if desired, the acidic material may be neutralized by treating it with any suitable hydrate, oxide or carbonate of an alkali-forming metal. In the class of alkali-forming metals we include the ammonium radical, in addition to sodium, potassium, calcium and magnesium. We may, therefore, employ, for example, caustic soda, caustic potash, ammonium hydroxide, magnesium oxide, calcium oxide, or calcium carbonate, or other suitable hydrates, or carbonates. In order to reduce the expense of transporting the demulsifying agent to the place where it is to be used to treat a petroleum emulsion, the derivative of lignin, used to form said demulsifying agent, may, if desired, be concentrated so as to increase the specific gravity of same to approximately 30 to 32° Baumé. It can even be dried to a substantially anhydrous state, and in some instances, it is preferable to use it in this condition.

One procedure that may be employed to produce a water-soluble derivative of lignin suitable for use as the treating agent or demulsifying agent of our process, is as follows: Pure straw is subjected to the action of caustic soda in a digestor until solution is substantially as complete as possible. This alkaline solution is then separated from the undissolved material and subjected to the action of an acid in order to separate the lignin bodies. The said lignin bodies are then cooked under pressure in a digestor with sulfite liquor of the kind used in the manufacture of sulfite paper stock, the digestion being carried on under approximately 90 lbs. pressure for a period varying from 6 hours to 72 hours. The material or substance produced by this procedure is a particular kind of a water-soluble acidic derivative of lignin, i. e., a sulfo-lignic acid, and is particularly adapted for use as a demulsifying agent or treating agent in the resolution of petroleum emulsions of the water-in-oil type. Said material or substance can be added directly to the emulsion to be treated, either as a dry powder after concentration, or as a water solution, or else suspended in oil or emulsified as a concentrated solution in oil. If desired, the dry powder can be suspended in oil by the presence of an agent, such as calcium oleate.

Although the substance or material above described is a valuable demulsifying agent by virtue of its own properties, we have found that a demulsifying agent exceptionally efficient for treating petroleum emulsions of the water-in-oil type can be produced by mixing a substance or material of the kind above described with other materials of the kind generally used to treat such emulsions, such, for example, as water softeners, modified fatty acids, etc.

In practising our process a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing said agent into the well in which the emulsion is produced; introducing said agent into a conduit through which the emulsion is flowing; introducing said agent into a tank in which the emulsion is stored; or introducing said agent into a container that holds a sludge obtained from the bottom of the oil storage tank. In some instances it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground.

After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils", the minimum ratio above referred to is often necessary, but in treating fresh emulsions, i. e., emulsions that will yield readily to the action of demulsifying agents, the maximum ratio above mentioned will frequently produce highly satisfactory results. For the average petroleum emulsion of the water-in-oil type, a ratio of 1 part of treating agent to 5,000 parts of emulsion will usually be found to produce commercially satisfactory results.

Having thus described our invention, what we claim as new and desire to secure by Letters Patent of the United States is:

1. A process for breaking a petroleum emulsion of the water-in-oil type, which consists in subjecting the emulsion to the action of a demulsifying agent containing a water-soluble derivative of lignin.

2. A process for breaking a petroleum emulsion of the water-in-oil type, which consists in subjecting the emulsion to the action of a demulsifying agent containing a water-soluble acidic derivative of lignin.

3. A process for breaking a petroleum emulsion of the water-in-oil type, which consists in subjecting the emulsion to the action of a demulsifying agent containing water-soluble salts of an acidic derivative of lignin.

4. A process for breaking a petroleum emulsion of the water-in-oil type, which consists in subjecting the emulsion to the action of a demulsifying agent containing water-soluble salts of the alkali-forming metals of an acidic derivative of lignin.

5. A process for breaking a petroleum emulsion of the water-in-oil type, which consists in subjecting the emulsion to the action of a demulsifying agent containing water-soluble magnesium salts of an acidic derivative of lignin.

6. A process for breaking a petroleum emulsion of the water-in-oil type, which consists in subjecting the emulsion to the action of a demulsifying agent containing a water-soluble sulfur-containing acidic derivative of lignin.

7. A process for breaking a petroleum emulsion of the water-in-oil type, which consists in subjecting the emulsion to the action of a demulsifying agent containing water-soluble salts of a sulfur-containing acidic derivative of lignin.

8. A process for breaking a petroleum emulsion of the water-in-oil type, which consists in subjecting the emulsion to the action of a demulsifying agent containing water-soluble salts of the alkali-forming metals of a sulfur-containing acidic derivative of lignin.

9. A process for breaking a petroleum emulsion of the water-in-oil type, which consists in subjecting the emulsion to the action of a demulsifying agent containing water-soluble magnesium salts of a sulfur-containing acidic derivative of lignin.

MELVIN DE GROOTE.
LOUIS T. MONSON.